July 22, 1958  J. A. McCANN  2,844,787
MEANS FOR DETECTING FLAWS
Filed Oct. 9, 1952  2 Sheets-Sheet 1
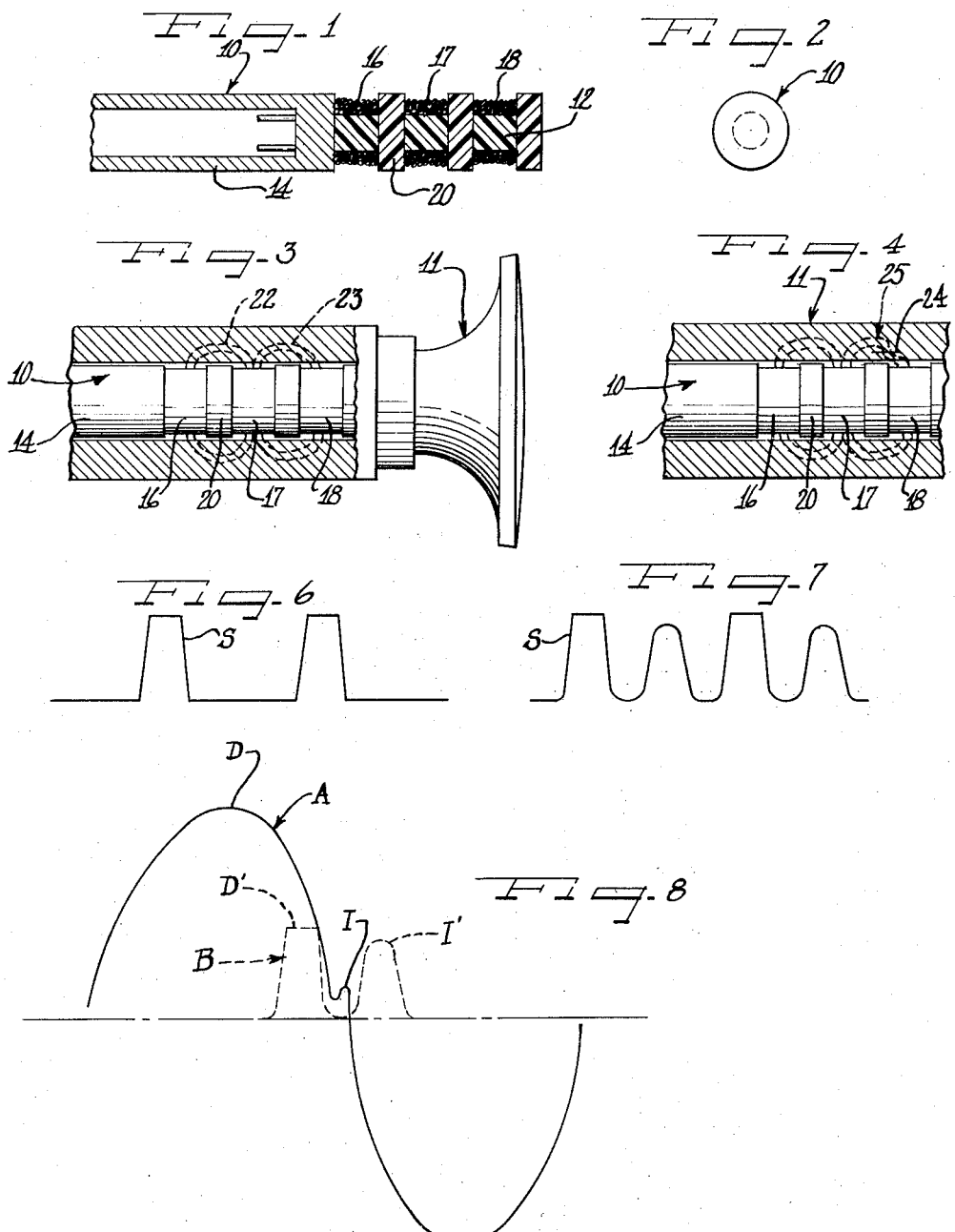
Inventor
Joseph Arthur McCann July 22, 1958   J. A. McCANN   2,844,787
MEANS FOR DETECTING FLAWS
Filed Oct. 9, 1952   2 Sheets-Sheet 2
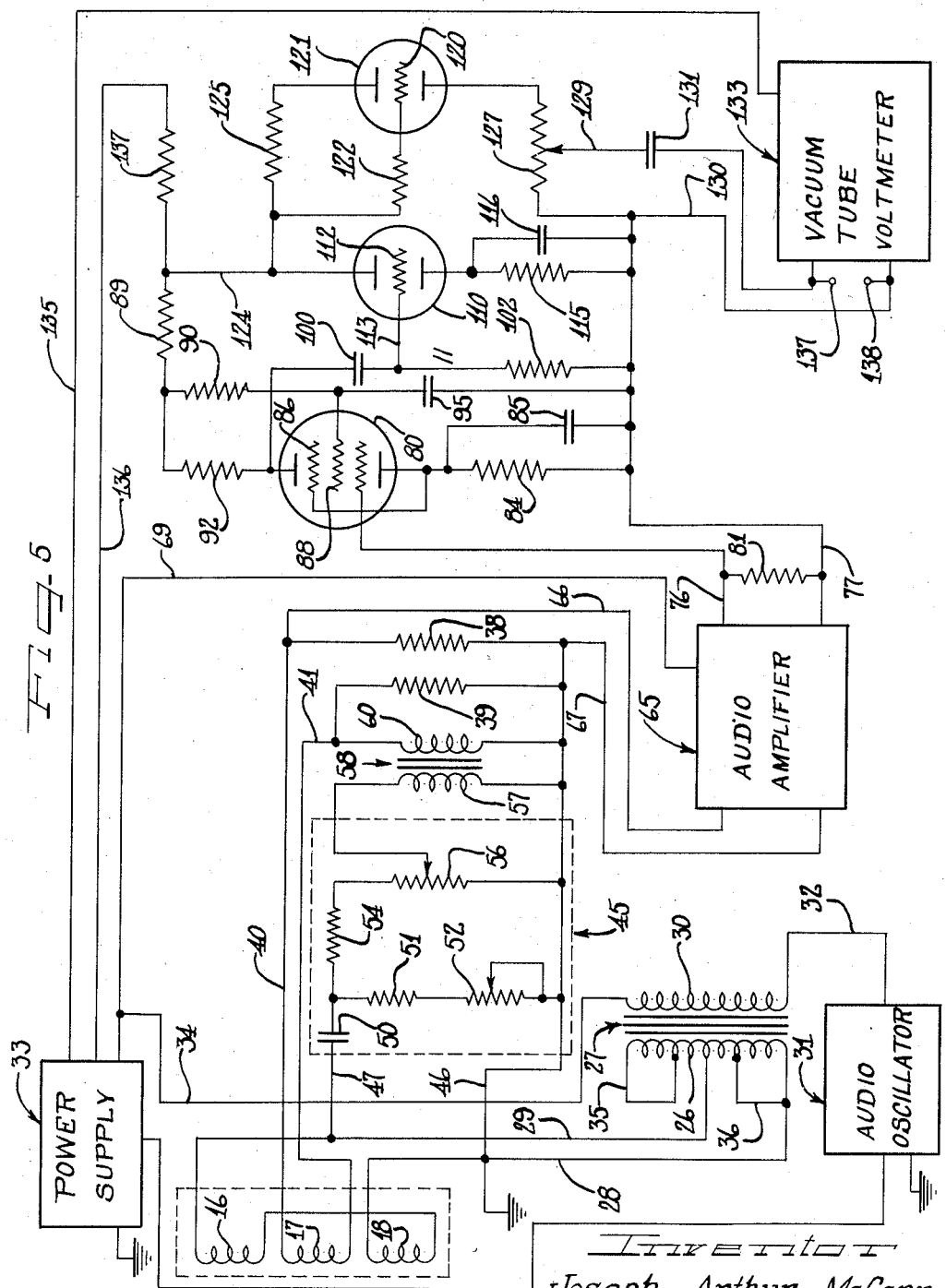
Inventor
Joseph Arthur McCann United States Patent Office 2,844,787
Patented July 22, 1958

2,844,787

MEANS FOR DETECTING FLAWS

Joseph Arthur McCann, Cleveland, Ohio, assignor to Thompson Products, Inc., Cleveland, Ohio, a corporation of Ohio Application October 9, 1952, Serial No. 313,855

11 Claims. (Cl. 324—37)

This invention relates to a method and means for detecting flaws in bodies of metallic material and especially to a method and means for discovering subsurface defects in tubular bodies.

In the manufacture of aircraft valves made of high nickel alloy, discovery of defects in the tubular stem of the valves has been a difficult problem. The failure in the final product appears as a crack which cannot be reliably located visually or by X-ray. Further, the final product represents an expensive investment, so that it is highly desirable to detect flaws in the valves at the earliest possible manufacturing operation. By reliably discovering defective valves and those likely to crack from further machining immediately after forging and heat treatment, substantial savings in the cost of manufacture of these valves can be effected.

The problem will be more readily appreciated when it is understood that after forging and heat treatment the valve stem may have an inside diameter of 0.481 inch and an outside diameter of one and three-sixteenths inches while the finished valve stem may have an outside diameter of 0.731 inch. Thus, an inner portion or layer having a thickness of 0.125 inch must be inspected, while the large mass of metal outwardly of this thickness is not important in the final product. It was found that existing commercial equipment was capable of checking only the entire mass of the valve, and thus was not suited to problem here suggested where where the ratio of total mass to mass to be tested for defects is large.

It is, therefore, an important object of the present invention to provide a novel method and means for reliably discovering flaws in tubular articles.

It is a further object of the present invention to provide a novel method and means for discovering flaws beneath the surface of an unfinished tubular article.

It is another object of the present invention to provide novel apparatus for testing for defects only in an inner annular layer of a tubular article.

It is still a further object of the present invention to provide a novel method and means for detecting an unbalance in opposing magnetic fields.

It is yet another object of the present invention to provide a novel method and means for detecting and emphasizing a harmonic component of unbalanced opposing magnetic fields.

It is still another and further object of the present invention to provide a novel method and means for emphasizing a desired harmonic component of a signal and for segregating said harmonic component from the remainder of the signal.

It is a more general object of the present invention to provide a method and means for discovering flaws in the interior of a body of metallic material.

It is another more general object of the present invention to provide a method and means for segregating a minor peak in a periodic wave form from a major peak.

It is a further more general object of the present invention to provide a method and means for segregating a minor inflection portion of a periodic wave form from a dominant portion where the minor portion is more responsive to changes in a condition to be detected, and for suppressing the dominant portion, and especially for suppressing the dominant portion and rendering its amplitude independent of variations in said condition.

The novel features which I believe to be characteristic of my invention are set forth with particularity in the appended claims. My invention itself, however, both, as to its organization, manner of construction and method of operation, together with further objects and advantages thereof may best be understood by reference to the following description taken in connection with the accompanying drawings, in which:

Figure 1 is a sectional view of a probe constructed in accordance with the principles and teachings of the present invention;

Figure 2 is an end view of the probe of Figure 1;

Figure 3 is a diagrammatic illustration of the magnetic field distribution when the probe is inserted in a tubular body;

Figure 4 is a diagrammatic view similar to Figure 3, but indicating the effect of a discontinuity on the magnetic field;

Figure 5 is a diagrammatic illustration of the electric circuit of a test instrument constructed in accordance with the principles and teachings of the present invention;

Figure 6 represents the wave form of the output of the instrument as found by means of a cathode ray oscilloscope with the test probe in a homogeneous medium;

Figure 7 represents the wave form of the output as shown by a cathode ray oscilloscope with the test probe in the region of a discontinuity in a body under test; and Figure 8 is a diagrammatic illustration of the segregating function of the electric circuit of Figure 5.

The present invention is particularly adapted for inspecting an interior layer of a tubular article for flaws and an embodiment for this purpose will be now described.

By way of example, it may be desired to test the tubular stem of an aircraft valve made of high nickel alloy. With the dimensions of the valve stem as mentioned previously, namely an I. D. of 0.481 inch and an O. D. of 1 3/16 inches and with the finished valve to have an O. D. of 0.731 inch, it has been found that a magnetic field can be made to penetrate an inner layer of a thickness of 0.125 inch, with the necessary electrical and magnetic stability also being achieved, if a frequency in the neighborhood of 1000 C. P. S. is selected. Further, by utilizing such a frequency, the metal outwardly of the inner layer of the valve, which is to be removed in subsequent machining operations, has little or no effect on the test. Thus, the apparent effect of utilizing such a frequency is to reduce the ratio of total mass to mass under test for defects, and as a consequence to cause any flaw in the inner layer to appear larger to the measuring system.

In the particular example cited, a magnetic field having a frequency of 7000 C. P. S. was found to be confined to the interior surface of the stem, and thus capable of detecting only surface flaws. A frequency of 3000 C. P. S. was found to give results inferior to those at 1000 C. P. S. with the particular instrument to be hereinafter described. More generally, it has been found experimentally that the magnetic field penetration is dependent upon the constitution of the material to be tested, the mass of the material, and the applied frequency.

It should be noted that the high nickel alloy above referred to has a very low permeability and is not a ferromagnetic material. Thus, the instrument of the present invention is well adapted for detecting flaws in bodies which are not ferromagnetic, as well as in bodies which are considered ferromagnetic.

Referring now to the drawings wherein is disclosed an instrument adapted for detecting flaws under the conditions of the particular example discussed above, Figure 1 illustrates a probe 10 for insertion into a tubular body such as the stem of an aircraft valve indicated at 11 in Figures 3 and 4. The probe 10 may comprise a cylindrical non-magnetic core 12 carried by a handle 14, with three coils 16, 17 and 18 wound on the core and axially separated by spacer disks 20. Each coil, for example, may comprise 1000 turns of No. 30 wire. The outer coils 16 and 18 may be wound in electrical opposition so as to normally set up opposite symmetrical magnetic fields in the region of the center coil 17, as indicated diagrammatically in Figure 3 at 22 and 23.

The probe may be so proportioned that only about one inch of the length of the stem would be tested for each position of the probe along the length of the stem. A defect 24 in the stem within the area under test gives rise to a distortion in the magnetic field as indicated at 25 in Figure 4. The defect thus causes an unbalance of the opposing magnetic fields and a resultant induced voltage in the center coil 17. As the probe is moved along the stem, it will be appreciated that the voltage induced by the defect 24 will vary from one polarity when the field of coil 18 is distorted to the opposite polarity when the field of coil 16 is distorted. By virtue of the symmetry of the system, the middle point will be indicative of the location of the defect.

Discontinuities which may be detected in this manner include voids, magnetic oxide inclusions, fractures due to overstressing of metals, regions in which there are sharp lines of demarcation between grain structures, and differences of stress conditions.

It has been found that the output from the coil 17 will have a third harmonic component and that this third harmonic component is more sensitive to flaws in a body under test than the fundamental. In other words, when the probe is within a body to be tested, inequalities in the electrical characteristics of the exciting coils 16 and 18 and in the spacing of coils 16 and 18 from coil 17 and unimportant discontinuities in the portion of the body under test will give rise to an induced voltage in the coil 17 even though no serious defect is distorting the field of the probe. The fundamental component of this normal induced voltage when no defect is present is not greatly different from the fundamental component of the voltage induced by a serious defect in the field of the probe. On the other hand, the third harmonic of the voltage induced in coil 17 with a serious defect in the field of the probe is substantially greater than the third harmonic of the normal induced voltage with no serious defect in the probe field.

Since the third harmonic component of the induced voltage due to a defect in the body under test is small relative to the fundamental component, the simple measurement of voltage induced in the coil 17 as the probe is moved along the body to be tested does not give a reliable and sensitive indication of flaws in the body.

In the preferred embodiment of the present invention, therefore, means is provided for segregating the third harmonic component from the fundamental. Further, means is preferably provided for emphasizing the component to be segregated and also for de-emphasizing the fundamental component. By these procedures, an output is obtained which is substantially affected by changes in the third harmonic due to flaws in the body under test. As a result, a simple measuring instrument such as vacuum tube voltmeter will reliably register flaws in a body under test, and in a manner readily interpreted by semi-skilled labor.

Referring to the drawings, Figure 8 is intended to illustrate diagrammatically this principle of segregation of the third harmonic of the voltage induced in coil 17 due to a defect. The solid curve A represents the wave form of the voltage induced in coil 17. The region of inflection indicated at I on curve A represents the influence of the third harmonic on the wave form. It will be observed that area added to the curve A by virtue of inflection I is very small in comparison to the area produced by the dominant portion D. For comparison, the wave form obtained by the segregating procedure is indicated in dash outline at B in Figure 8. The square portion D' is intended to correspond to the dominant portion D of the non-segregated wave form while the curved portion I' is intended to be the result of the third harmonic region I.

The actual wave forms obtained by means of a cathode ray oscilloscope connected to the output of the segregating means to be hereinafter described are illustrated in Figures 6 and 7. Figure 6 illustrates the wave form with the probe in air, while Figure 7 illustrates the wave form when a defect is present. It will thus be observed that a defect gives rise to a substantial change in the area under the output curve. For example, with the embodiment illustrated in the drawings, a change of 3 volts on the 30 volt scale of a vacuum tube voltmeter is obtained as an indication of a defect.

The electric circuit for energizing the probe coils and for emphasizing and segregating the third harmonic component, and de-emphasizing the fundamental component of voltages induced in coil 17 will now be described, having reference to Figure 5 of the drawings.

Coils 16 and 18 are connected in series opposition across the secondary winding 26 of transformer 27 by means of leads 28 and 29. The primary winding 30 of the transformer 27 is connected to the output of audio oscillator 31 by lead 32 and to the power supply 33 by lead 34. The purpose of the output transformer shunting leads 35 and 36 is to improve the impedance match. The coil 17 is connected across the grid input resistor 38 (of about 100,000 ohms) in series with resistor 39 (of about 10 ohms) by means of leads 40 and 41.

The output from the audio oscillator 31 is also fed into a phase shifting network 45 by means of leads 46 and 47 connected respectively with leads 28 and 29 from the secondary of transformer 27.

It will be observed that the network comprises an input condenser 50 (of about .02 microfarad) and pi network of resistances for adjusting the phase and amplitude of the signal supplied to resistor 39. The phase adjusting leg includes a fixed resistor 51 (of about 9,200 ohms) and a variable resistor 52 (of maximum value of about 10,000 ohms). A resistor 54 (of about 39,000 ohms) is connected between the phase adjusting leg and the amplitude adjusting variable resistance 56 (of about 10,000 ohms maximum value). The moving contact of the resistor 56 is connected to the primary coil 57 of transformer 58, the secondary coil 60 being connected across resistor 39.

If the audio oscillator 31 delivers a 1000 cycle signal, the phase shift network 45 introduces a 1000 cycle signal across resistor 39 which is in series with the output of coil 17 across the input to the first amplifier 65, but shifted in phase 5° to 10° relative to the 1000 cycle component of the output of coil 17. The resultant of the wave forms across coil 17 and resistor 39 will appear across the input resistance 38 and be introduced into amplifier 65 by leads 66 and 67.

The audio amplifier 65 may comprise three triode amplifier stages, employing negative feedback between the first and second stages for stability and having an overall gain of 500. A cathode follower stage may be used for gain control and to block off effects of the succeeding section. Power is indicated as being supplied to the amplifier section 65 from power supply 33 by means of lead 69. The output from the audio amplifier 65 is delivered by means of leads 76 and 77 to the next section of the circuit which may be termed the second amplifier.

The first stage of the second amplifier comprises a sharp cut-off pentode 80 (which may be type 6AU6) having a grid input resistance 81 (of about 470,000 ohms) across which the output of the first amplifier is developed. The pentode 80 is biased by means of a cathode resistor 84 (of about 2,200 ohms) which has a by-pass condenser 85 (of about 10 microfarads) thereacross. The suppressor grid 86 of the pentode is connected to the cathode, and the screen grid 88 is supplied with voltage from the power supply through resistance 89 (of about 270,000 ohms) and resistance 90 (of about 68,000 ohms). Plate voltage is supplied through resistor 89 and resistor 92 (of about 100,000 ohms). A screen by-pass condenser 95 (of about .01 microfarad) is connected between screen grid 88 and ground line 77.

The output from the pentode 80 is then fed into a differentiating network including condenser 100 (of about .002 microfarad) and resistance 102 (of about 100,000 ohms).

The triode 110 (which may comprise one-half of a type 12AT7 tube) then amplifies the output across resistor 102 and inverts the wave form, triode 110 having its control grid 112 connected by lead 113 between condenser 100 and resistor 102. The triode has a cathode resistor 115 (of about 1000 ohms) bypassed by a condenser 116 (of about 25 microfarads). Plate voltage is supplied from power lead 136 through resistor 137 (of about 47,000 ohms).

The output from triode 110 is fed to the grid 120 of triode 121 (which may comprise the other half of the type 12AT7 tube) through resistor 122 (of about 1000 ohms). Plate voltage is fed to triode 110 from power supply 33, lead 136, resistor 137, lead 124, and resistor 125 (of about 68,000 ohms). The output from triode 121 is taken off variable resistor 127 (of about 70,000 ohms) in the cathode circuit and delivered by means of leads 129 and 130 through coupling condenser 131 (of about 8 microfarads) to vacuum tube voltmeter 133. Power is indicated as being supplied to voltmeter 133 by means of lead 135.

*Operation*

The function of the phase shift network 45 and of the second amplifier section will now be indicated.

The function of the phase shift network is to emphasize the third harmonic component so as to improve the segregation effect of the second amplifier and thus to obtain an increased voltage change at the vacuum tube voltmeter for a given defect. In setting up the instrument for testing, the probe is inserted in a valve having a defect. It is preferable that a cathode ray oscilloscope be connected across the output terminals 137 and 138 of the second amplifier in parallel with the vacuum tube voltmeter to indicate the wave form of the output. The phase control resistor 52 and amplitude control resistor 56 are then adjusted until the wave form of Figure 7 appears at the cathode ray oscilloscope. The oscilloscope may then be disconnected. The vacuum tube voltmeter 133 should now show a difference of at least 3 volts on the 30 volt scale as the probe is moved down the stem of the valve. If the reading is less, minor adjustment of the amplitude control resistor 56 will give the proper reading.

By adjusting the phase shifting network 45 as described, a wave form resembling that indicated at A in Figure 8 may be obtained. The pentode stage of the second amplifier is designed so as to clip the bottom portion of the wave form A in Figure 8. The resulting output from the pentode therefore may include a minor "pip" corresponding to region of inflection I in Figure 8 and a major "pip" corresponding to the dominant peak D in Figure 8. The output network (capacitor 100 and resistor 102) then differentiates to emphasize the minor pip relative to the major pip, the triode 110 amplifies to regain power, and triode 121 has the function of clipping the peak of the major pip to a constant amplitude to de-emphasize the same relative to the minor pip. It will be observed from Figures 6 and 7 that by virtue of the peak clipping effect, the amplitude of the square portion S of the output remains constant so that variations in the dominant peak D of Figure 8 will have no effect on the reading of the vacuum tube voltmeter.

The output signal from the second amplifier can be measured with any standard vacuum tube voltmeter having an input impedance exceeding ten million ohms, or any cathode ray oscilloscope, or by selection of a go-no go light circuit. Experimental limits are established by recording voltage change, and correlating this with results of metallurgical examinations.

While the invention is clear from the foregoing description, the following is believed to be the action of the phase shifting network. It has been found that the amplitude of the third harmonic may be approximately one-tenth the amplitude of the fundamental induced in coil 17. Thus, the third harmonic will have little effect on the area under the output wave form of coil 17. In practice, the harmonic may cause inflections in the coil output curve, for example, at the peak of the curve. If now a second signal having the fundamental frequency is superimposed on the coil output fundamental, the result is a sine wave of modified phase angle and amplitude. When this modified sine wave is combined with the harmonic, and the amplitude and phase properly adjusted, the resultant wave form is found to have a broader inflection and to be moved toward the base line. By this means, when the negative portions of the resultant wave forms (such as A in Figure 8) are clipped, the inflection region due to the harmonic can be readily segregated and emphasized.

The purpose of this "signal-base" clipping is broadly to de-emphasize the fundamental by reducing its area by approximately one-half. The de-emphasizing is completed by the peak-clipping stage which limits the amplitude of the fundamental contribution to the final output. The presence of the differentiating network, as previouly mentioned, is to emphasize the inflection produced by the harmonic component It will be apparent that the phase shifting network may be omitted where the third harmonic is sufficiently strong or where the point of inflection of the output wave form of coil 17 is positioned so as to be capable of segregation from the dominant peak. However, the phase shifting network makes possible adjustment of the circuit for optimum operation for different probes and other conditions, and thus is highly desirable.

It will be understood that the signal-base clipping circsuit is not essential since the differentiating circuit might produce segregated pulses directly from the output of the first amplifier and the amplitude of the pulses produced by the fundamental can then be substantially reduced in proportion to the pulses produced from the harmonics.

Further, the configuration of the coils on the probe may be changed or adapted to different shaped objects. For example, for testing for flaws in a flat plate, four exciting coils might be arranged at the corners of a square and with coil axes perpendicular to the plate, the detecting coil being placed parallel thereto and in the center of the square and one pair of exciting coils being connected to be in electrical opposition to the other pair.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. Means for detecting internal flaws in a tubular article, comprising a probe for insertion into said article and having a pair of oppositely wound exciting coils for generating magnetic fields in the tubular wall of said article, coil means for generating a signal in response to an unbalance in said magnetic fields due to a flaw in said article, a phase shifting network having an input in parallel with said exciting coils and an output in series with said coil means, the resultant unbalance signal from said coil means including a harmonic which is especially sensitive to flaws in said article, and means responsive to said harmonic of said resultant signal to indicate flaws in said article, said last mentioned responsive means comprising means for clipping the portions of the resultant signal of one polarity, and means for differentiating the clipped signal.

2. Means for detecting internal flaws in a tubular article, comprising a probe for insertion into said article and having a pair of oppositely wound exciting coils for generating magnetic fields in the tubular wall of said article, coil means for generating a signal in response to an unbalance in said magnetic fields due to a flaw in said article, a phase shifting network having an input in parallel with said exciting coils and an output in series with said coil means, the resultant unbalance signal from said coil means including a harmonic which is especially sensitive to flaws in said article, and means responsive to said harmonic of said resultant signal to indicate flaws in said article, said last mentioned responsive means comprising means for clipping the portions of the resultant signal of one polarity, means for differentiating the clipped signal, and means for clipping the peak of the differentiated signal.

3. Means for detecting flaws in a body, comprising a source of alternating electrical energy, coils connected across said source for generating symmetrical opposed magnetic fields in said body, coil means for disposition in proximity to said magnetic fields for detecting an imbalance therein due to flaws in said body, an amplifier stage receiving the output of said coil means, a phase shift network interposed between said source and the input to said amplifier stage, the output from said phase shift network being introduced to the input of said amplifier stage in series with the output from said coil means, the output from said amplifier stage including a harmonic especially responsive to distortions in said magnetic fields caused by flaws in said body, and means differentially responsive to said harmonic of the amplifier output for indicating the existence of flaws in said body.

4. Means for detecting flaws in a body, comprising a source of alternating electrical energy, coils connected across said source for generating symmetrical opposed magnetic fields in said body, coil means for disposition in proximity to said magnetic fields for detecting an imbalance therein due to flaws in said body, an amplifier stage receiving the output of said coil means, a phase shift network interposed between said source and the input to said amplifier stage, the output from said phase shift network being introduced to the input of said amplifier stage in series with the output from said coil means, the output from said amplifier stage including a harmonic especially responsive to distortions in said magnetic fields caused by flaws in said body, and means differentially responsive to said harmonic of the amplifier output for indicating the existence of flaws in said body, said differentially responsive means including a differentiating network.

5. Means for detecting internal flaws in an article, comprising a pair of oppositely wound exciting coils for generating balanced magnetic fields in said article, coil means for generating a signal in response to an unbalance of said magnetic fields due to a flaw in said article, a phase shifting network having an output in series with said coil means for adding a signal of frequency corresponding to the fundamental frequency of said magnetic fields but shifted in phase relative thereto to the unbalance signal from said coil means to provide a resultant unbalance signal including a harmonic which is especially sensitive to flaws in said article, and means responsive to said harmonic of said resultant signal comprising means for clipping the portions of the resultant signal of one polarity, means for differentiating the clipped signal, and means for clipping the peak of the differentiated signal.

6. Apparatus for detecting flaws in an article, comprising means for setting up symmetrical opposed magnetic fields in said article, coil means for generating a signal in response to an unbalance in said magnetic fields due to a flaw in said article, means for superimposing on the signal generated by said coil means due to unbalance of said magnetic fields a signal of frequency corresponding to the fundamental frequency of said magnetic fields but shifted in phase relative thereto, the resultant unbalance signal including a harmonic which is especially sensitive to flaws in said article, and means for segregating said harmonic from said resultant signal comprising means for clipping portions of the resultant signal of one polarity, means for differentiating the clipped signal, and means for clipping the peak of the differentiated signal.

7. Apparatus for detecting flaws in metallic articles comprising means for generating balanced opposed alternating magnetic fields in said article, coil means for generating a signal in response to an unbalance in said magnetic fields due to a flaw in said article, means for superimposing on the signal induced in said coil a signal corresponding in frequency to the fundamental frequency of said magnetic fields but shifted in phase relative thereto, the resultant unbalance signal from said coil means including a third harmonic component which is especially sensitive to flaws in said article, and means for segregating said third harmonic component of said resultant signal comprising means for clipping the portions of the resultant signal of one polarity, means for differentiating the clipped signal, and means for clipping the peaks of the differentiated signal.

8. In combination in means for detecting discontinuities in articles, means for establishing a magnetic field penetrating the article, means coupled to said magnetic field for generating a first electric signal waveform and responsive to alterations in the magnetic field due to discontinuities in the article to produce a harmonic signal, means for superimposing on said first signal waveform a second signal corresponding to said first signal waveform but shifted in phase relative thereto by an angle other than zero degrees or 180 degrees to emphasize the harmonic signal in the resultant waveform, and means for producing separate pulses representing said harmonic signal when the harmonic signal appears in said resultant signal waveform.

9. In combination in means for detecting flaws in articles, means for establishing a magnetic field penetrating the article, means coupled to said magnetic field for generating a first electric signal and responsive to flaws in said article to produce a harmonic flaw signal, means for superimposing on said first electric signal a second signal of corresponding frequency but shifted in phase relative to said first signal to emphasize the harmonic flaw signal in the resultant signal waveform, and means for differentiating the resultant signal to further emphasize the harmonic flaw signal.

10. Apparatus for measuring a harmonic frequency component of an alternating electrical signal, comprising means for superimposing on the signal a second signal having the fundamental frequency of the first mentioned signal but shifted in phase by a small angle relative to the first signal, means for clipping said signal to obtain unidirectional pulses, means for differentiating said pulses to obtain one separate pulse on each cycle caused primarily by a harmonic frequency component in the first-mentioned signal, and another pulse caused primarily by other portions of said first-mentioned signal to emphasize said harmonic component, and means for limiting the differentiated signal to reduce the amplitude of said another pulse relative to said one pulse, whereby the measured value of the limited signal is comparatively sensitive to the harmonic frequency component.

11. Apparatus for detecting discontinuities in articles comprising means for establishing a magnetic field in the article, means coupled to said magnetic field for producing a first signal in the absence of a discontinuity in the article and for producing a second signal in the presence of a discontinuity including a harmonic inflection in the second signal signal waveform, means for clipping portions of the second signal to emphasize said inflection, means for differentiating the clipped signal and means for clipping the peaks of the differentiated signal to produce separate pulses in the output signal representing said harmonic inflection.

References Cited in the file of this patent

UNITED STATES PATENTS

| | | |
|---|---|---|
| 1,954,996 | Hehn | Apr. 17, 1934 |
| 2,005,011 | Specht | June 18, 1935 |
| 2,007,772 | Sams et al. | July 9, 1935 |
| 2,104,644 | Greenslade et al. | Jan. 4, 1938 |
| 2,150,922 | Hay | Mar. 21, 1939 |
| 2,290,330 | Irwin | July 21, 1942 |
| 2,337,231 | Cloud | Dec. 21, 1943 |
| 2,434,922 | Grieg | Jan. 27, 1948 |
| 2,450,868 | Berman | Oct. 12, 1948 |
| 2,511,564 | Callan | June 13, 1950 |
| 2,540,589 | Long | Feb. 6, 1951 |
| 2,549,567 | Berman | Apr. 17, 1951 |
| 2,594,947 | Lynch | Apr. 29, 1952 |
| 2,715,815 | Malick et al. | Aug. 23, 1955 |